United States Patent [19]

Batchelder

[11] Patent Number: 5,064,038
[45] Date of Patent: Nov. 12, 1991

[54] OVERRUNNING CLUTCH WITH IMPROVED SPRING COIL AND MOUNTING OF SAME

[76] Inventor: J. William Batchelder, R.R. 1, Box 71-A, Charlestown, N.H. 03603

[21] Appl. No.: 651,167

[22] Filed: Feb. 6, 1991

[51] Int. Cl.⁵ ............................................. F16D 43/02
[52] U.S. Cl. ................................. 192/41 S; 192/41 R; 192/81 C
[58] Field of Search ................ 192/41 S, 41 R, 81 C; 464/40

[56] References Cited

U.S. PATENT DOCUMENTS

| | | | |
|---|---|---|---|
| 3,064,766 | 11/1962 | Hanizeski | 192/41 S X |
| 3,346,083 | 10/1967 | Bochan | 192/41 S X |
| 3,537,275 | 11/1970 | Smith | 192/41 S X |
| 3,955,662 | 5/1976 | Thackston | 464/40 X |
| 3,956,905 | 5/1976 | Thackston | 464/40 |
| 4,199,046 | 4/1980 | Boyd | 192/41 S X |
| 4,313,530 | 2/1982 | Boyd | 192/41 S |
| 4,869,357 | 9/1989 | Batchelder | 192/41 S |

Primary Examiner—Allan D. Herrmann
Assistant Examiner—Nicholas Whitelaw
Attorney, Agent, or Firm—Sughrue, Mion, Zinn, Macpeak & Seas

[57] ABSTRACT

An overrunning clutch is provided with increased torque transmitting capacity by utilizing a relatively large diameter spring wire whose end turns have their radial peripheries ground down to weaken the end turns proximate to the free end of the spring. Preferably the end turns proximate to the free end of the coil spring are tapered radially inwardly to lift the spring coil turns remote from the free end off the shaft of the overrunning clutch. The end of the coil spring fixed to the bushing may be formed as a hook having a portion extending radially through a slot within the bushing and an integral bent back circumferential portion nested in a annular groove within the outer periphery of the bushing intersecting the radial slot. A double helical coil spring having parallel, adjacent turns within separate helical grooves within the inner periphery of the bushing has a loop connecting the turns opposite their free ends mounted within a transverse channel connecting the pair of helical grooves.

14 Claims, 1 Drawing Sheet

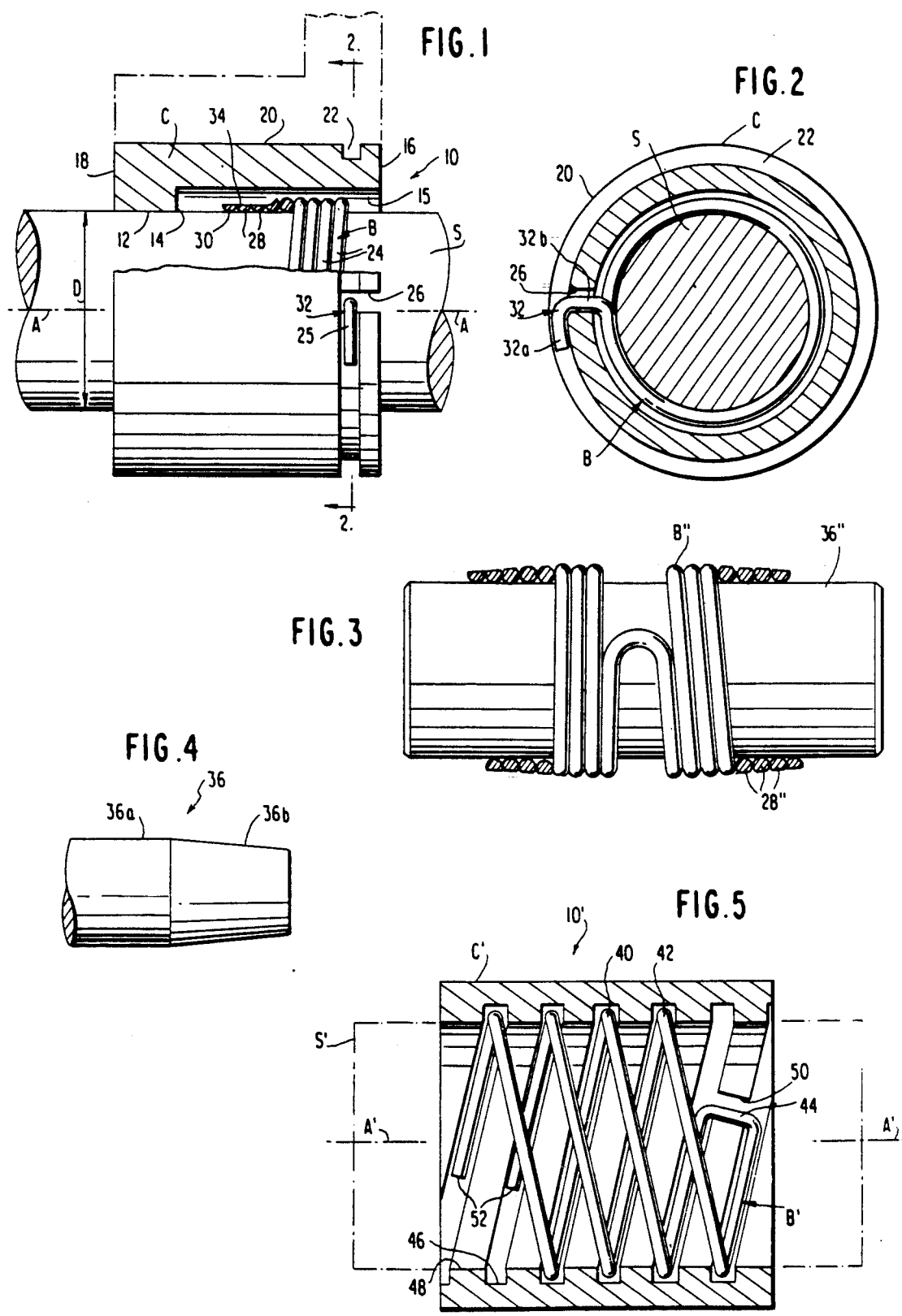

OVERRUNNING CLUTCH WITH IMPROVED SPRING COIL AND MOUNTING OF SAME

FIELD OF THE INVENTION

This invention relates to an overrunning clutch of the type having a coil spring interposed between concentric cylindrical bushing and shaft members, and more particularly to such coil spring with increased torque transmitting capacity without compromise of the frictional snubbing action of the free end of the coil spring and to a simplified mounting arrangement for such metal coil spring having dual free ends within parallel helical grooves within the periphery of the bushing or shaft member.

BACKGROUND OF THE INVENTION

The overrunning clutch to which the present invention is directed, is of the type set forth in my U.S. Pat. No. 4,869,357 issued Sept. 26, 1989 and entitled Overrunning Clutch with Grooved Bushing for Reception of Spring Coil. In the overrunning clutch of my prior patent, preferably the cylindrical bushing member included at least one groove of a depth and width to fully accommodate a coil spring within the inner periphery of the bushing with the spring, when relaxed, having an inner diameter slightly larger than the diameter of the shaft member projecting axially through the bushing member. With the coil spring fixed relative to the bushing so as to be nonrotative, the coil spring has at least one free end in frictional engagement with the periphery of the shaft. Relative rotation of the bushing and the shaft in one direction causes multiple turns of the coil spring to engage the periphery of the shaft and to snub the spring, and to thereby cause a driving member to rotate a driven member as fast as that of the driving member. Additionally, the driven member is permitted to rotate faster and free-wheel to overrun the driving member.

While such overrunning clutches as exemplified by my prior U.S. Pat. No. 4,869,357 have operated satisfactorily, I have determined that the torque transmitting capacity of the coil spring overrunning clutch may be greatly increased by using a larger diameter spring wire. However, there is required a significantly increased radial force on the shaft by the free end of the spring to initiate the snubbing action due to the increased stiffness in the spring wire as a result of the increase in diameter of the same. When such radial force becomes too large, it can cause the spring wire to score or abrade the shaft.

In U.S. Pat. No. 4,313,530 issued Feb. 2, 1982 to Boyd and entitled Brake Actuator for Bicycles and the Like, a solution to the problem of scoring or abrading the shaft involves the welding of leader springs of wires having a relatively small diameter to the axially inboard ends of a number of turns of wire of larger diameter, acting as the load carrying wire of the clutch. However, the connection between such two high carbon steel wires is bulky, cumbersome, and results in less than a 100% strength of connection. Such overrunning clutch structures are subject to failure, particularly since the heat of welding draws the temper of the wires.

It is therefore a primary object of this invention to provide a single, unitary coil spring for overrunning clutches including a relatively large diameter load carrying coil terminating in turns proximate to the free end of the coil spring whose radially outer or radially inner peripheries are ground down to render these turns less rigid and to facilitate the initiation of the snubbing action for the clutch.

It is a further object of the invention to provide a simplified mounting of a double spring coil having dual free ends, received within respective adjacent, parallel helical grooves, within the inner periphery of the bushing or the outer periphery of the shaft, irrespective of whether the spring coil terminates in turns proximate to the free end whose outer or inner peripheries are ground down to facilitate free end functional engagement with the periphery of the shaft or bushing.

BRIEF DESCRIPTION OF THE DRAWINGS

FIG. 1 is a side elevational view, partially broken away, of an overrunning clutch forming a preferred embodiment of the invention.

FIG. 2 is a sectional view of the overrunning clutch of FIG. 1 taken about line 2—2.

FIG. 3 is a side elevational view of a spring coil for an overrunning clutch forming a further embodiment of the invention, mounted on a mandrel and having multiple coil turns proximate to the free ends of the coil spring taper ground to facilitate free end engagement of the spring coil with the overrunning clutch shaft.

FIG. 4 is an elevational view of an alternately configured mandrel for taper winding a spring coil of the overrunning clutch of FIG. 1 prior to grinding down the peripheries of the free end turns.

FIG. 5 is a longitudinal sectional view of a bushing and coil spring assembly for an overrunning clutch forming an alternate embodiment of the invention.

DESCRIPTION OF THE PREFERRED EMBODIMENTS

Referring to drawing FIGS. 1, 2 and 4, an overrunning clutch forming a preferred embodiment of the invention is indicated generally at 10 and includes a driven member in the form of a cylindrical shaft S of relatively small diameter, which may be driven by an electrical motor (not shown) in the manner of my U.S. Pat. No. 4,869,357. The shaft is thus rotated about an axis A. The clutch 10 is formed additionally by a helical coil spring B, preferably made of piano wire or the like, which is hard, strong, wear resistant and inexpensive. The inner diameter of the coil spring B, when relaxed, is slightly larger than the outer diameter of the shaft S (or of a thin, hard metal sleeve, not shown) which may be carried by the shaft S in accordance with my prior patent. The third element of the clutch is a hollow, cylindrical bushing C which concentrically surrounds the coil spring B and with the coil spring B in turn, concentrically surrounding shaft S.

The bushing C has its inner periphery 12, of a diameter which is in slightly in excess of the diameter D of shaft S. The inner periphery 12 of the bushing C is stopped at 14 over a significant axial length of the same from end 16 to accommodate the helical coil spring B. The Annular recess 15 extends from end 16 of the bushing towards its opposite axial end 18. In accordance with one aspect of this invention, the outer periphery 20 bushing C is provided with annular groove 22 adjacent to axial end 16, of a width and depth, in excess of the diameter of the spring, wire forming the turns of the helical coil spring B, proximate to one end 25 of the coil spring. Further, the bushing C is provided with a radial slot 26 which is of a width in excess of the diameter of the piano wire forming the coil spring B and which slot extends axially through the radial groove 22. This permits, the one end 25 of the coil spring B to include a 180° reverse turn hook 32 with that hook accommodated within the circumferential groove 22 and a radial slot 26. The result is to securely lock mechanically, the one end 25 of the coil spring B within the bushing C, while turns 28 of the coil spring B at the other, free end 30, are in frictional engagement with the periphery of the shaft S. Thus, the coil spring B is provided with hook 32 having a circumferential portion 32a nested in the annular groove 22 and a radial portion 32b projecting radially through radial slot 26 within the end 16 of that bushing.

While the groove 22 extends over the full circumferential surface of the busing C at its outer periphery, the groove 22 may be substantially shorter, but must be of a circumferential length capable of receiving the circumferential portion 32a of hook 32.

As a further and principle aspect of the present invention, the overrunning clutch as embodied in FIGS. 1 and 2, has the end turns 28 of the coil spring B, ground down at 34 on the radially outer peripheries of several turns proximate to free end 30 of that coil spring. The grinding down of the coil turns 28 proximate to free end 30 of the spring may be effected by a grinding wheel, pressed to the outer peripheries of those turns with the spring B mounted to a cylindrical mandrel having a diameter approximately equal to that of the coil spring B and with the periphery of the cylindrical grinding wheel, essentially parallel to the periphery of the mandrel. As a result, the last several turns as per FIG. 1 are ground down to the same radial extent. As a result of grounding down the end coils of the overrunning clutch coil spring proximate to the free end or ends of such spring, I have created an overrunning clutch which uses larger diameter wire for accommodating large clutch loads but which includes integral, weaker, less rigid end turns to initiate the snubbing action necessary for clutch operation without marring the shaft.

Using the same cylindrical mandrel, by positioning the periphery of the cylindrical grinding wheel slightly oblique to the axis of the mandrel 36", FIG. 3, end turns 28" of the coil spring B" proximate to the free end or ends of such coil springs may be ground down with the radial height of the turns varying from turn to turn, thus, producing taper ground end turns with the taper in the direction of the axis of the coil spring from the unground turns of the coil spring towards the free end of the coil spring (or opposite dual free ends of a coil spring as per FIG. 3).

In addition to causing the end coil proximate to the free end or free ends of the coil spring to be weaker and less rigid, it is preferred that the mounting of the coil spring on the shaft is such that the larger load carrying coil turns of the spring slightly clear the shaft, thereby reducing the friction thereon when the clutch is overrunning and only the weaker end turns of the end coil turns proximate to the free end of the coil spring having slightly smaller inside diameter contact the shaft to initiate the snubbing by the stronger coils.

Such taper configuration may be accomplished by winding the coil springs on a tapered or barrel shaped mandrel such as that shown in FIG. 4 to produce a slightly smaller inside diameter of the spring turns for those coil spring turns proximate to the free end or free ends of the spring.

In accordance with FIG. 4, mandrel 36, is provided with a cylindrical portion 36a and an integral conical portion 36b. Portion 36a has a uniform diameter while, portion 36b is of frustoconical form. In the manufacture of the coil spring B of the embodiment of the invention as per FIGS. 1 and 2, the turns 24 are wrapped about portion 36a of the tapered mandrel 36 while, the turns 28 are wrapped about the frustoconical tapered portion 36b. The grinding down of end turns 28 may then be accomplished on the same mandrel 36 by slight oblique inclination of the outer peripheral surface of a cylindrical grinding wheel whose outer periphery is present against the radially outer peripheral surfaces of turns 28 until they are ground down to the required amount which may be approximately one half their diameters, as per FIG. 1. Tapered springs per se are known however, the present invention is directed to the utilization of tapered springs having a ground down peripheral surface of coil end turns proximate to the free end or ends used as an overrunning clutch coil spring.

Turning to FIG. 5, an overrunning clutch 10' is shown as comprising a bushing C' of hollow cylindrical form having an inside diameter slightly in excess of the diameter of a shaft S' to be coaxially received thereby and in which a double helical turn coil spring B' is mounted and is so configured that parallel helical coil turns 40 and 42 extend over some distance axially within the bushing C', which turns 40 and 42 are joined at the middle of the piano wire employed in making up the coil spring B' by a loop or junction portion 44. Further, in accordance with my prior U.S. Pat. No. 4,869,357, parallel helical grooves 46 are formed within the inner periphery 48 of the bushing C' of a width and depth which are in excess of the diameter of the piano wire forming the coil spring B'.

The improvement as exemplified in the embodiment of FIG. 5, is the manner in which the clutch coil spring B' is anchored to the bushing C'. In this case, a transverse groove or channel 50 of a depth in excess of the diameter of the spring wire of coil spring B' connects adjacent spiral grooves 46 with the groove or channel 50 of the bushing to accommodate the junction portion or loop 44, coil spring B' having dual free ends 52 for frictional engagement with the outer periphery of shaft S'. The junction portion 44 is essentially a loop from which the parallel turns 40, 42 of the helical coil spring B' emanate. It is only necessary as in the illustrated embodiment of FIG. 5 that the turns 40, 42 wrap about the exterior of the shaft S' to provide a constricting or snubbing action for the free ends 52 of the coil springs B'.

In the various embodiments of the invention, the action and operation of the clutch elements are essentially the same and in accordance with my issued U.S. Pat. No. 4,859,357 whose content is incorporated herein. Further, while multiple embodiments of the invention have been shown and described, additional modifications thereof may be made by one skilled in the art without departing from the spirit of the invention and it is desired to cover by letters patent, all forms of the invention falling within the scope of the following claims:

What is claimed:
1. In an overrunning clutch comprising:
a rotatable shaft member,
a rotatable cylindrical bushing member concentrically mounted on said shaft member and having an inner diameter slightly larger than the outer diameter of the shaft member, and a coil spring concentrically interposed between such shaft member and said bushing member, having one portion positively affixed to one of said members and at least one free end in frictional contact with the other member, such that by applying power to one of said members to drive the other member by frictional drag through said spring by snubbing of the coil spring about said driven member, the driven member is required to rotate as fast as a driving member but the driven member is free to rotate faster than the driving member and can overrun the same, the improvement, wherein;

the helical coil spring having turns proximate to a free end whose shaved radial faces such that the diameter of the coil spring turns remote from the free end is relatively large to absorb heavy clutch loads without compromising the frictional engagement capability of the free end of the coil spring.

2. The overrunning clutch as claimed in claim 1, wherein said shaved radial faces of said coil spring turns proximate to the free end thereof are radial outer faces of said coil spring turns.

3. The overrunning clutch as claimed in claim 2, wherein said shaved radial faces of said coil spring turns proximate to the free end of the coil spring are of uniform thickness.

4. The overrunning clutch as claimed in claim 1, wherein said shaved radial faces of said coil spring turns proximate to the free end thereof are of progressively reduced thickness in the direction of the free end of the coil spring, thereby tapering radially inwardly in a direction remote from the fixed portion of said coil spring.

5. The overrunning clutch as claimed in claim 2, wherein said shaved radial faces of said coil spring turns proximate to the free end thereof are of progressively reduced thickness in the direction of the free end of the coil spring, thereby tapering radially inwardly in a direction remote from the fixed portion of said coil spring.

6. The overrunning clutch as claimed in claim 3, wherein said shaved radial faces of said coil spring turns proximate to the free end thereof are of progressively reduced thickness in the direction of the free end of the coil spring, thereby tapering radially inwardly in a direction remote from the fixed portion of said coil spring.

7. The overrunning clutch as claimed in claim 1, wherein said coil spring turns proximate to the free end thereof are of progressively reduced internal diameter in the direction of the free end of the coil spring.

8. The overrunning clutch as claimed in claim 2, wherein said coil spring turns proximate to the free end thereof are of progressively reduced internal diameter in the direction of the free end of the coil spring.

9. The overrunning clutch as claimed in claim 3, wherein said coil spring turns proximate to the free end thereof are of progressively reduced internal diameter in the direction of the free end of the coil spring.

10. The overrunning clutch as claimed in claim 4, wherein said coil spring turns proximate to the free end thereof are of progressively reduced internal diameter in the direction of the free end of the coil spring.

11. The overrunning clutch as claimed in claim 6, wherein said coil spring turns proximate to the free end thereof are of progressively reduced internal diameter in the direction of the free end of the coil spring.

12. In an overrunning clutch comprising a rotatable shaft member, a rotatable cylindrical bushing member concentrically mounted about said shaft member and having an inner diameter slightly larger than the outer diameter of the shaft member, and a coil spring concentrically interposed between such shaft member and said bushing member and having one end portion positively fixed to one of said members and at least one free end in frictional contact with the other member such that a rotation in a predetermined direction of said shaft member relative to said bushing member, said at least free end of the spring fictionally drags on the other member and snubs the spring about said other member to effect a clutching action between the two members in rotation of one member by the other such that the driven member is required to rotate as fast as the driving member but the driven member is free to rotate faster than the driving member, said bushing member including an annular groove of a depth and width to fully accommodate the coil spring when fully relaxed, the improvement wherein;

the coil spring comprises a double coil spring having two axially spaced helically wound sections concentrically wound about the shaft with said sections occupying parallel helical annular grooves of a depth and width fully accommodating the coil spring section when fully relaxed, and wherein a short length of wire forms a spring loop connecting said two sections and wherein, said bushing member includes a channel on the inner periphery of the bushing member connecting said parallel helical annular grooves receiving said loop and fixing the loop to the bushing member thereby preventing rotation of the double coil spring about the axis of the bushing during shaft rotation therein.

13. The overrunning clutch as claimed in claim 12, wherein the said channel is at a right angle to the parallel groove and oblique to the axis of the bushing.

14. In an overrunning clutch comprising a rotatable shaft member, a rotatable cylindrical bushing member concentrically mounted on said shaft member and having an inner diameter slightly larger than the outer diameter of the shaft member, a coil spring concentrically interposed between said shaft member and said bushing member, having one portion particularly fixed to said bushing and having at least one free end in frictional contact with the shaft, whereby by applying power to one of said members, the other member is driven by frictional drag through the spring by snubbing of the coil spring about the driven member with the driven member rotating as fast as the driving member but the driven member being free to rotate faster than the driving member and overrunning the same, the improvement wherein;

said bushing member includes a radial slot within an axial end face of said bushing member, and the outer periphery of the said bushing member includes, a circumferential groove tending over at least a portion of its periphery intersecting said radial slot, and wherein the radial slot is of a width, and said circumferential groove is of a width and depth in excess of the diameter of the wire forming said coil spring and wherein, said end of said coil spring fixed to said bushing, is in the form of a hook formed by a radially projecting portion positioned within said radial slot, and an integral reversely directed circumferential portion positioned within said circumferential groove, so as to positively affix said coil spring to said bushing member and ensuring maintenance of the fixably coupling of the coil spring to the bushing member irrespective of the extent of loading of the coil spring during clutch operation.

* * * * *